United States Patent
Lee et al.

(10) Patent No.: US 11,867,999 B2
(45) Date of Patent: Jan. 9, 2024

(54) COLOR FILTER AND METHOD FOR MANUFACTURING COLOR FILTER

(71) Applicant: SEMES CO., LTD., Chungcheongnam-do (KR)

(72) Inventors: Jun Seok Lee, Chungcheongnam-do (KR); Yoon-Ok Jang, Chungcheongnam-do (KR); Sung Ho Kim, Chungcheongnam-do (KR); Kwang Jun Choi, Daejeon (KR); Hyun Min Lee, Gyeongsangnam-do (KR)

(73) Assignee: SEMES CO., LTD., Chungcheongnam-Do (KR)

( * ) Notice: Subject to any disclaimer, the term of this patent is extended or adjusted under 35 U.S.C. 154(b) by 0 days.

(21) Appl. No.: 17/405,667

(22) Filed: Aug. 18, 2021

(65) Prior Publication Data
US 2022/0055376 A1 Feb. 24, 2022

(30) Foreign Application Priority Data
Aug. 18, 2020 (KR) .................. 10-2020-0103145

(51) Int. Cl.
*G02F 1/1335* (2006.01)

(52) U.S. Cl.
CPC .. *G02F 1/133514* (2013.01); *G02F 1/133516* (2013.01); *B41J 2202/09* (2013.01)

(58) Field of Classification Search
CPC ......... G02F 1/136222; G02F 1/133514; G02F 1/133516
See application file for complete search history.

(56) References Cited

U.S. PATENT DOCUMENTS

| | | | |
|---|---|---|---|
| 2007/0184363 A1* | 8/2007 | Kim | G02F 1/133512 430/7 |
| 2008/0231778 A1* | 9/2008 | Tsao | G02F 1/133516 349/156 |
| 2010/0157235 A1* | 6/2010 | Shim | G02F 1/133516 349/155 |
| 2020/0151416 A1* | 5/2020 | Wu | G02F 1/136286 |

FOREIGN PATENT DOCUMENTS

| | | | |
|---|---|---|---|
| JP | 2012203226 A | | 10/2012 |
| KR | 2007024236 A | * | 3/2007 |
| KR | 10-0742121 B1 | | 7/2007 |
| KR | 1020090005630 A | | 1/2009 |
| KR | 10-2013-0008892 A | | 1/2013 |
| KR | 101490491 B1 | | 2/2015 |
| KR | 10-2017-0096583 A | | 8/2017 |

* cited by examiner

*Primary Examiner* — Alexander P Gross
(74) *Attorney, Agent, or Firm* — Procopio, Cory, Hargreaves & Savitch LLP

(57) ABSTRACT

A color filter is provided. The color filter includes a substrate, a bank formed on a substrate to partition a plurality of pixel units into each other, a plurality of first structures formed on the pixel unit, and having a width narrower than a width of the pixel unit, and a height lower than a height of the bank, and an ink film filled in the pixel unit and having a height higher than the height of the first structures.

6 Claims, 8 Drawing Sheets

(a)

(b)

(c)

(a)

(b)

(c)

(a)

(b)

(c)

(a)

(b)

(c)

(d)

COLOR FILTER AND METHOD FOR MANUFACTURING COLOR FILTER

CROSS-REFERENCE TO RELATED APPLICATIONS

A claim for priority under 35 U.S.C. § 119 is made to Korean Patent Application No. 10-2020-0103145 filed on Aug. 18, 2020, in the Korean Intellectual Property Office, the entire contents of which are hereby incorporated by reference.

BACKGROUND

Embodiments of the inventive concept described herein relate to a color filter used for a liquid crystal display. More particularly, embodiments of the inventive concept described herein relate to a method for manufacturing a color filter by applying a manner of discharging liquid crystal micro-droplets, based on an ink-jet printing technique.

There has been suggested a method for forming a coloring layer (pixel unit) by jetting coloring ink through an ink-jet printing technique to manufacture a color filter used for a color liquid crystal display. The ink-jet printing technique may be simply used and require a smaller amount of ink with a lower price.

However, referring to FIG. 1, a color filter includes pixel units corresponding to red (R), green (G), and blue (B) and banks 4 corresponding to boundary surfaces among the RGB pixel units. After ink droplets are dropped to the pixel units to form ink films, the pixel units should be filled with RGB ink films and other regions should be maintained to be clean. However, a micro-spot 2 may be produced on a top surface of the bank 4. The contaminated bank 4 produces adverse effect on the characteristic of a display panel, such that the display panel is failed.

Inventors of the inventive concept have been recognized, in the procedure of finding out the cause of the micro-spot 2, that ink may be rebounded and scattered with higher probability when the ink collides with a substrate, as an ink droplet is jet and supplied to the pixel unit, as illustrated in FIG. 2, and have been understood that the rebounding and the scattering of the ink is the cause of the micro-spot 2.

SUMMARY

Embodiments of the inventive concept provide a color filter having higher quality and a method for manufacturing the color filter, in which a defect rate may be reduced.

Embodiments of the inventive concept provide a color filter, capable of minimizing micro-spots, and a method for manufacturing the color filter.

The technical problems to be solved by the inventive concept are not limited to the aforementioned problems, and any other technical problems not mentioned herein will be clearly understood from the following description by those skilled in the art to which the inventive concept pertains.

The inventive concept provides a color filter. According to an embodiment, a color filter includes a substrate, a bank formed on the substrate to partition a plurality of pixel units into each other, a plurality of first structures formed on the pixel unit, and having a width narrower than a width of the pixel unit, and a height lower than a height of the bank, and an ink film filled in the pixel unit and having a height higher than the height of the first structure.

According to an embodiment, the plurality of first structures may protrude upward from a surface, which constitutes the pixel unit, of the substrate.

According to an embodiment, a surface of the plurality of first structures may have an ink-philic property.

According to an embodiment, the plurality of first structures may include a transparent material.

According to an embodiment, the plurality of first structures may include a material that is etchable.

According to an embodiment, the plurality of first structures may include an insulating material.

According to an embodiment, the plurality of first structures may be arranged at distances ranging from several tens of nm to several tens of μm.

According to an embodiment, the surface, which makes contact with the ink film, of the pixel unit may include an ink-philic property.

According to an embodiment, a top surface of the bank may include an ink-repellent property.

According to an embodiment, the first structure may have a wall structure or a pillar structure.

In addition, the inventive concept provides a method for manufacturing a color filter. According to an embodiment, a method for manufacturing a color filter including an ink film formed in a plurality of pixel units surrounded by banks formed on a substrate, includes forming a film having a height lower than a height of the bank by filling a first material layer, which includes an material that is etchable, in the plurality of pixel units partitioned into each other by the bank formed on the substrate, forming a first photoresist thin film pattern on the first material layer, forming a plurality of first structures by etching the first material layer exposed between the first photoresist thin film patterns, removing the he first photoresist thin film patterns, and forming an ink film by filling ink into the pixel unit.

According to an embodiment, the plurality of first structures may include an ink-philic material.

According to an embodiment, the plurality of first structures may include a transparent material.

According to an embodiment, the plurality of first structures may include an insulating material.

According to an embodiment, a width of the first photoresist thin film pattern may be several tens of nm and a distance between first photoresist thin film patterns may be formed in the range from several tens of nm to several tens of um.

According to an embodiment, the surface of the substrate is treated to have an ink-philic property, and the bank may include an ink-philic material.

According to an embodiment, a top surface of the bank may be treated to have an ink-repellent property.

According to an embodiment, the bank may be formed on the substrate by treating a surface of the substrate to have an ink-philic property, laminating a second material layer having the ink-philic property on the substrate, treating a surface of the second material layer to have an ink-repellent property, forming a second photoresist thin film pattern on the second material layer, and etching the second material layer exposed between second photoresist thin film patterns.

According to an embodiment, the first structure may have a wall structure or a pillar structure.

According to another aspect of the inventive concept, a color filter includes a substrate including a top surface having an ink-philic property, a bank formed on the substrate to partition a plurality of pixel units into each other, and including a side surface having an ink-philic property and a top surface having an ink-repellent property, a plurality of first structures formed on the pixel unit, having a width narrower than a width of the pixel unit, having a height lower than a height of the bank, including an insulating material that is transparent and etchable, including a surface having an ink-philic property, and an ink film having a height higher than a height of the first structure and filled in the pixel unit.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
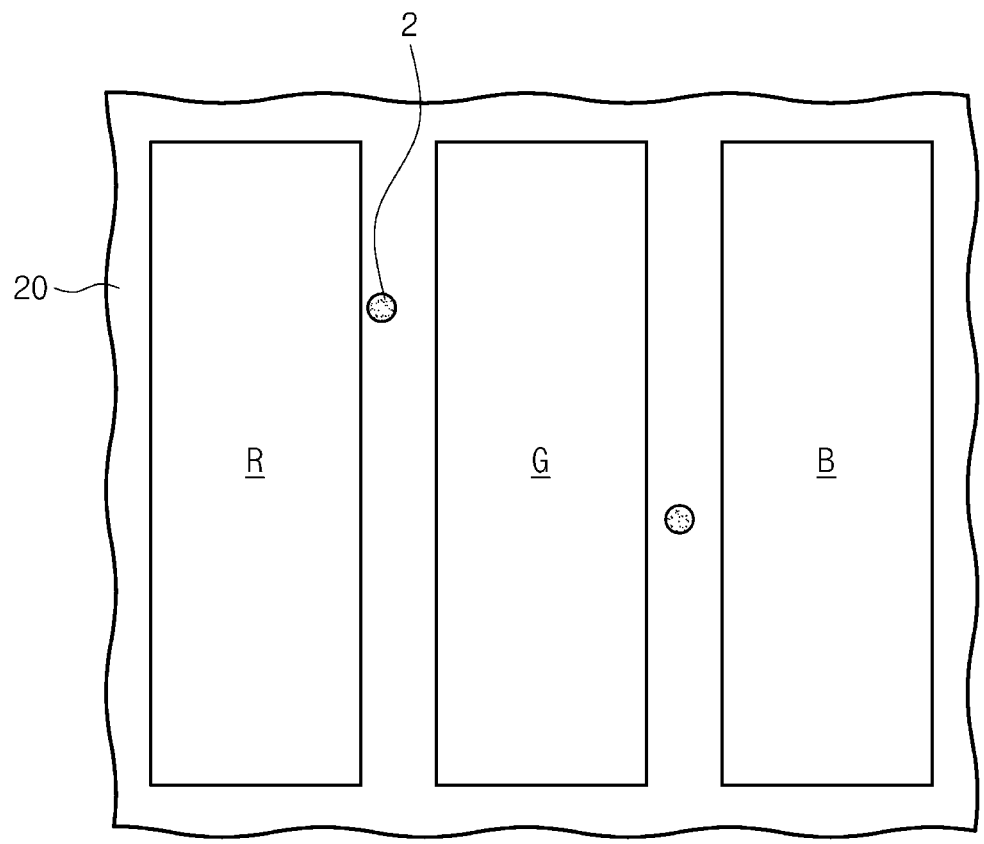
FIG. 1 illustrates a micro-spot produced on a top surface of a bank of a color filter manufactured according to a conventional method.
Figure 2:
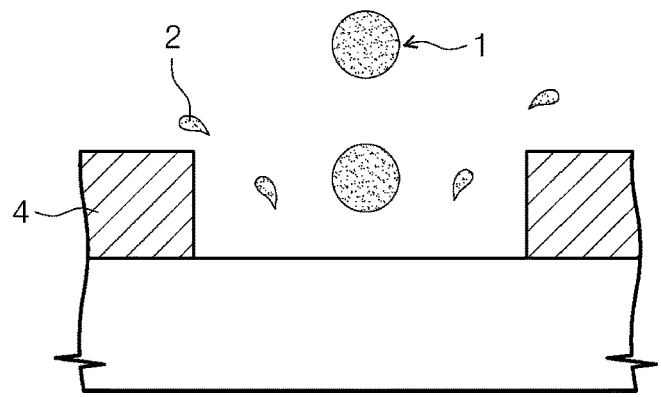
FIG. 2 sequentially illustrates a rebound phenomenon occurring as an ink droplet is dropped onto a color filter according to a conventional method and a conventional structure.
Figure 2:
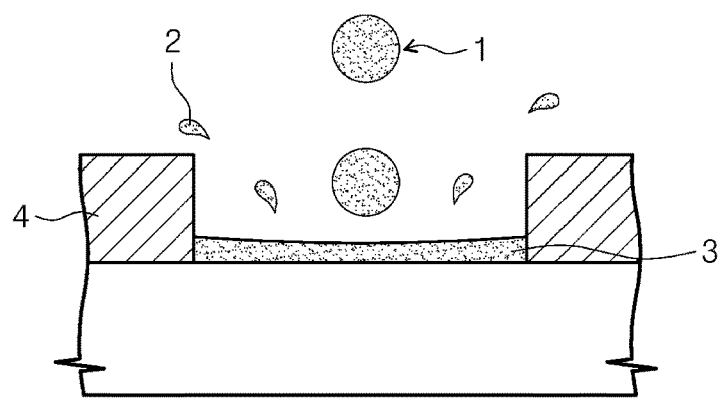
Figure 2:
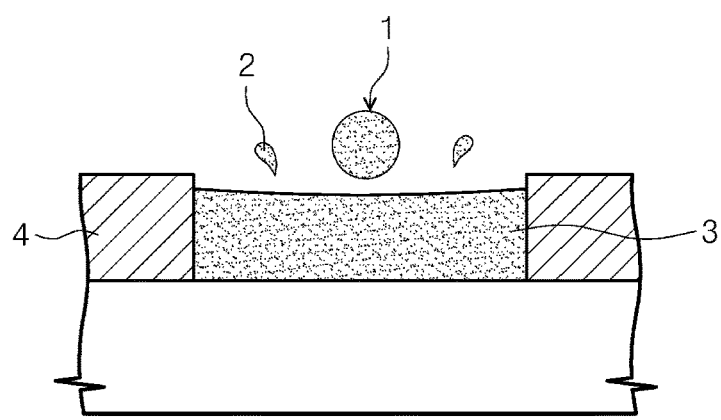

While the inventive concept is susceptible to various modifications and alternative forms, specific embodiments thereof are shown by way of example in the drawings and will be described in detail in the detailed description. It should be understood, however, that there is no intent to limit the inventive concept to the particular embodiment forms, but on the contrary, the inventive concept is to cover all transforms, equivalents, and alternatives falling within the spirit and scope of the inventive concept. In addition, in the following description of the inventive concept, a detailed description of well-known art or functions will be ruled out in order not to unnecessarily obscure the gist of the inventive concept.

The terminology used herein to describe embodiments of the inventive concept is not intended to limit the scope of the inventive concept. The singular forms are intended to include the plural forms unless the context clearly indicates otherwise. In the disclosure, It will be further understood that the terms "comprises," "comprising," "includes," or "including," or "having" specify the presence of stated features, numbers, steps, operations, components, parts, or the combination thereof, but do not preclude the presence or addition of one or more other features, numbers, steps, operations, components, parts, and/or the combination thereof.

Although the terms first, second, etc. may be used herein to describe various components, these components should not be limited by these terms. These terms are used to distinguish one component from another component.

Hereinafter, embodiments according to the present invention will be described with reference to accompanying drawings. In the following description made with reference to accompanying drawings, same or similar components will be assigned with same reference numerals, and the redundant repeat thereof will be omitted.

Figure 3:
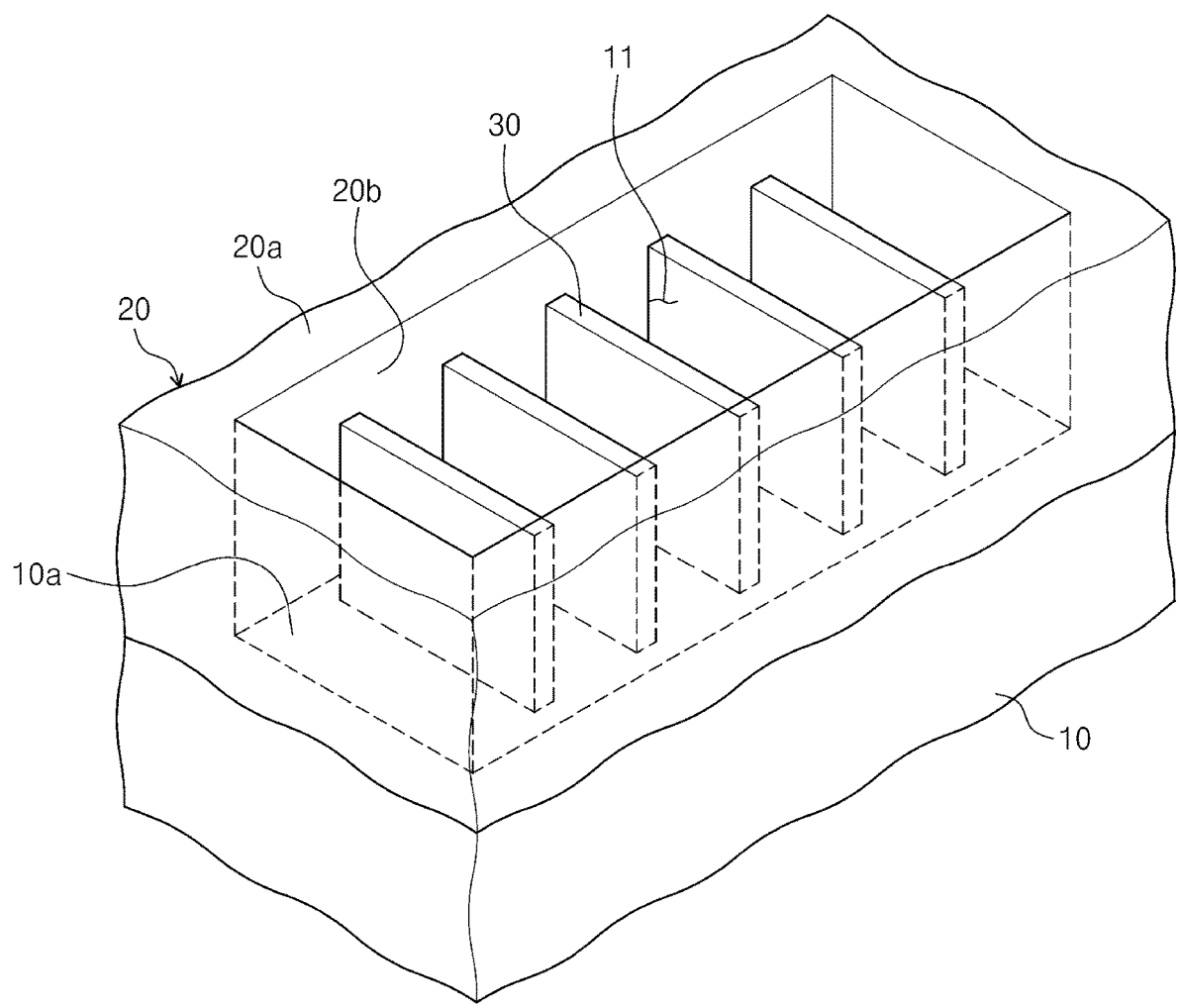
FIG. 3 is a perspective view illustrating one pixel unit constituting a color filter by cutting out the color filter, according to an embodiment of the inventive concept.

FIG. 3 is a perspective view illustrating one pixel unit constituting a color filter by cutting out the color filter, according to an embodiment of the inventive concept. As illustrated in drawings, a pixel unit 11 is a space filled with an ink liquid having one of red (R), green (G), and blue (B).

The pixel unit 11 is formed on a substrate 10. Pixel units 11 may be partitioned into each other by a bank 20 formed on the substrate 10. The bank 20 may include a black mask. The bank 20 includes a top surface 20a and a sidewall 20b.

The pixel unit 11 includes a plurality of first structures 30 formed in the pixel unit 11. The first structure 30 protrudes upward from a top surface of the substrate 10, which corresponds to a bottom surface constituting the pixel unit 11. According to an embodiment illustrated in FIG. 3, the first structure 30 may be provided in the form of a wall structure to partition the pixel unit 11 into a plurality of regions.

The first structure 30 having the wall structure is spaced apart from the sidewall 20b by a specific distance without making contact with the sidewall 20b. However, the first structure 30 having the wall structure may be provided to make contact with the sidewall 20b of the bank 20 defining the pixel unit 11. The shape of the first structure 30 may be varied depending on the characteristic of an ink liquid.

The surface of the first structure 30 has an ink-philic property. The first structure 30 may be formed of a transparent material to transmit light emitted from a rear portion. The first structure 30 preferably includes a material having a higher light transmission property. Preferably, the first structure 30 is formed of an insulating material to prevent an electrical property from being produced.

The first structure 30 may include various materials depending on techniques of manufacturing the first structure 30. However, preferably, the first structure 30 is formed of a material that is etchable. The material may be a material that is able to be grown from a film. In addition, the first structure 30 may be formed through a nano-imprinting technique.

The sidewall 20a of the bank 20, which defines the side surface of the pixel unit 11, and a top surface 10a of the substrate 10, which defines a bottom surface of the pixel unit 11, have an ink-philic property. For example, when ink has a hydrophilic property, the sidewall 20b of the bank 20 and the top surface 10a of the substrate 10 are provided to have a hydrophilic property.

The top surface 20a of the bank 20 is provided to have an ink-repellent property. For example, when the ink has a hydrophilic property, the top surface 20a of the bank 20 is provided to have a hydrophobic property.

Figure 4:
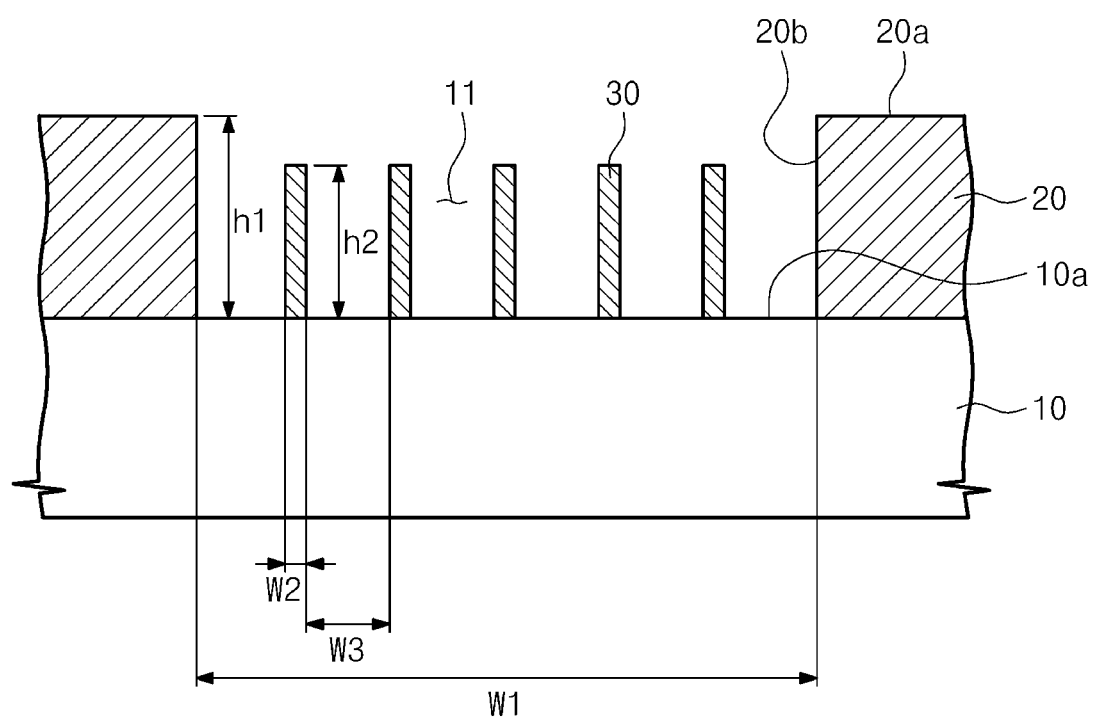
FIG. 4 is a cross-sectional view of one pixel unit constituting a color filter, according to an embodiment of the inventive concept.

FIG. 4 is a cross-sectional view of one pixel unit constituting a color filter, according to an embodiment of the inventive concept. The following description will be made with reference to FIG. 4. It should be understood that matters described with reference to FIG. 4 are provided for the convenience of explanation of the relation between the pixel unit 11 and the first structure 30, but the inventive concept is not limited to suggested numeric values.

According to an embodiment, the pixel unit 11 may have a width "W1" ranging from 80 μm to 120 μm. A width "W2" of the first structure 30 may be provided ranging from several tens of nm to several μm. For example, although the first structure 30 is provided to have the width "W2" of 20 nm, the first structure 30 should have the stiffness of the extent to prevent the first structure 30 from being collapsed when the first structure 30 collides with an ink droplet. The width "W2" of the first structure 30 may be set differently depending on the ink droplet, the collision stiffness of the first structure 30, and a material characteristic of the first structure 30. If possible, the first structure 30 is preferably provided to have a thinner width.

The distance between the first structures 30 is provided ranging from several tens of nm to several tens of μm. The distance between the first structures 30 may be set differently depending on the characteristic of an ink liquid. However, a smaller number of first structures 30 is preferable under the optimal condition in which the micro-spot is not produced. According to an embodiment, the proper number of pixel units 11 having the width "W1" ranging from 80 μm to 120 μm is in the range of five to ten, but the inventive concept is not limited.

The first structure 30 is formed to have the height "h2" lower than the height "h1" of the bank 20. Accordingly, the first structure 30 is not viewed from the top surface of a resultant structure at the final stage, after a desired amount of ink is dropped in the pixel unit 11, such that the first structure 30 is not recognized as a stain.

Figure 5:
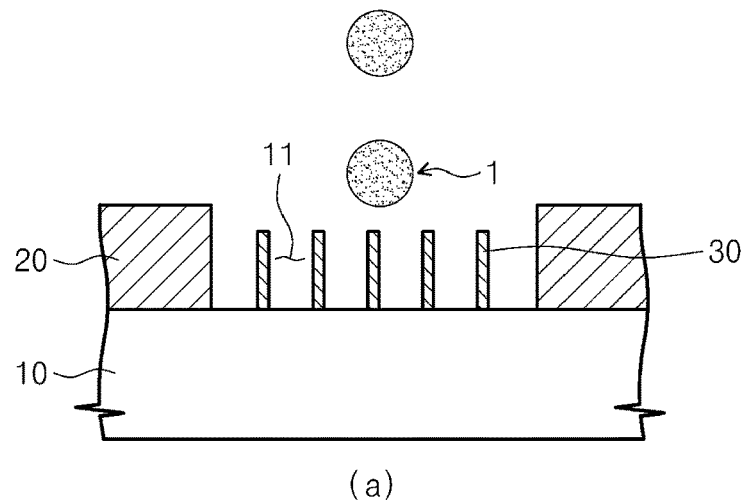
FIG. 5 sequentially illustrates a procedure of forming an ink film by dropping ink onto one pixel unit constituting a color filter, according to an embodiment of the inventive concept.
Figure 5:
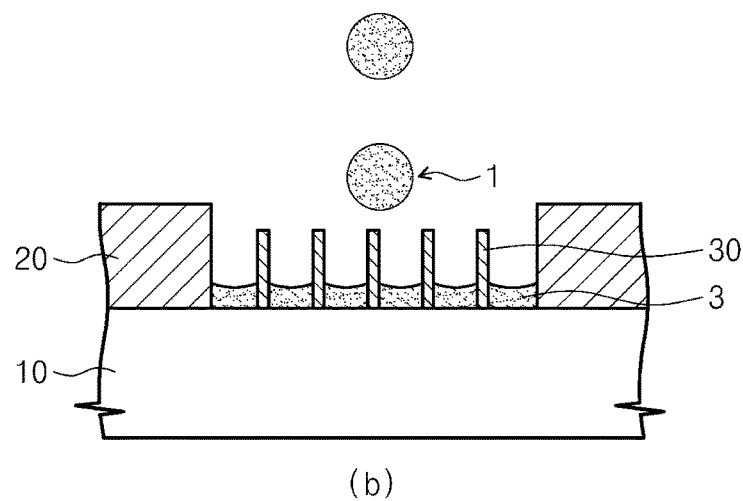
Figure 5:
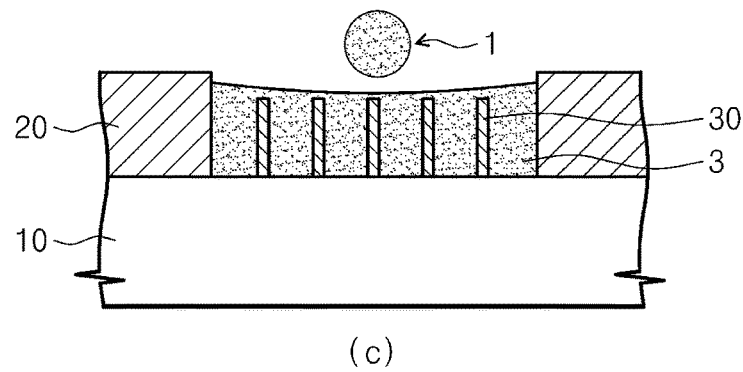

FIG. 5 sequentially illustrates a procedure of forming an ink film by dropping ink onto one pixel unit constituting a color filter, according to an embodiment of the inventive concept. Referring to FIG. 5, an ink droplet 1 first collides with the first structure 30 to produce a buffer effect, before colliding with the pixel unit 11, thereby reducing microspots caused by a rebounded ink droplet. The dropped ink may be spread at a lower portion of the pixel unit 11, depending on the pattern of the first structure 30.

Ten ink droplets 1 or less are dropped onto and filled in the pixel unit 11 to form an ink film 3. The ink film 3 is formed to be higher than the first structure 30 at the final stage.

Figure 6:
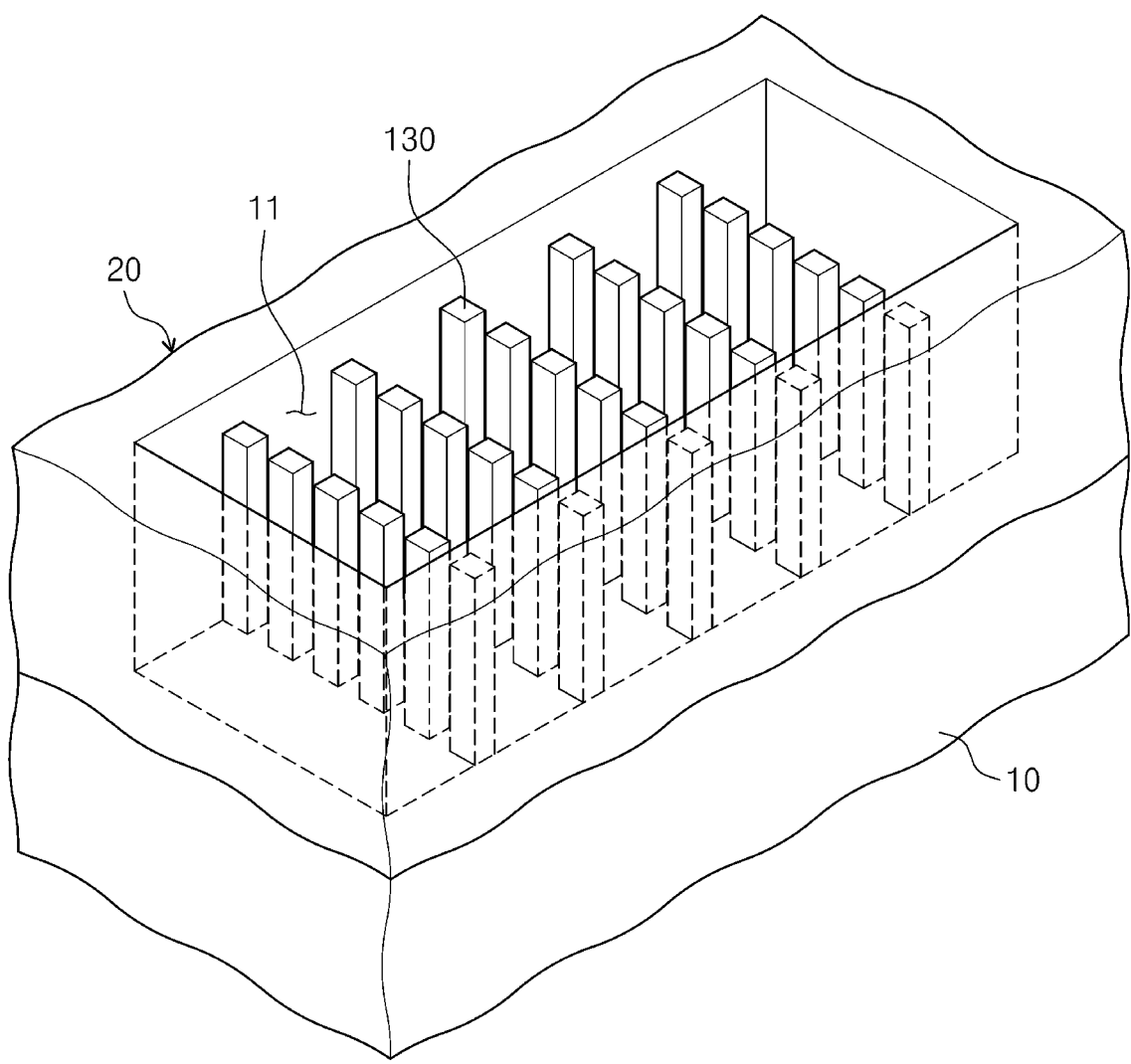
FIG. 6 is a perspective view illustrating one pixel unit constituting a color filter by cutting out the color filter, according to another of the inventive concept.

FIG. 6 is a perspective view illustrating one pixel unit constituting a color filter by cutting out the color filter, according to another of the inventive concept. According to another embodiment, a first structure 130 is provided in a pillar structure.

Although the description is made in that the first structure has a wall structure (see reference numeral 30) or a pillar structure (see reference numeral 130) by way of example, the first structure may have various structures as long as the first structure 30 splits the ink droplet 1 to produce a buffer effect before colliding with the bottom surface 10a of the pixel unit 11.

Figure 7:
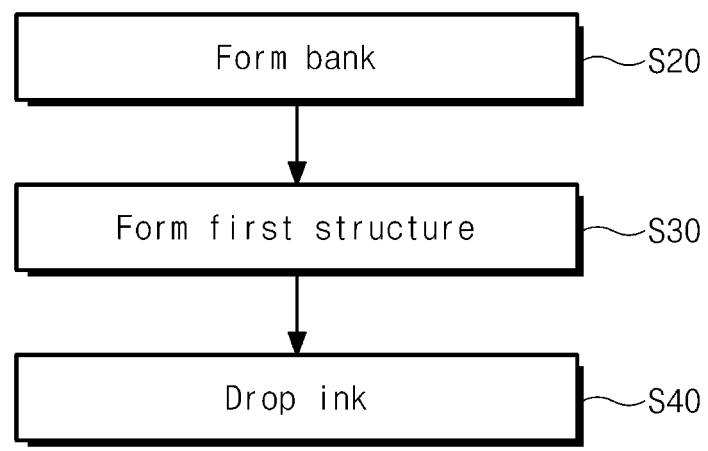
FIG. 7 is a flowchart illustrating a method for manufacturing a color filter, according to an embodiment of the inventive concept.
Figure 8:
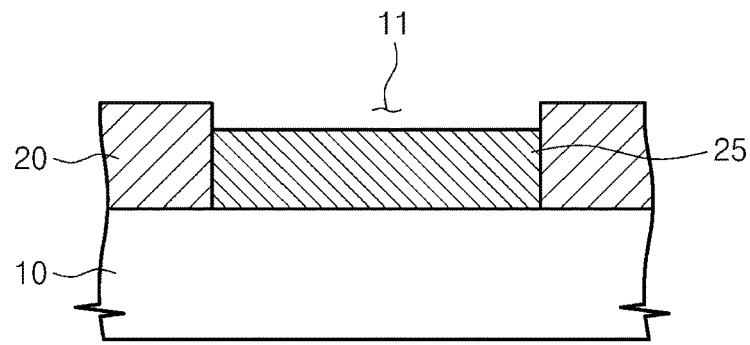
FIG. 8 illustrates a procedure of forming a first structure of a color filter, according to an embodiment of the inventive concept.
Figure 8:
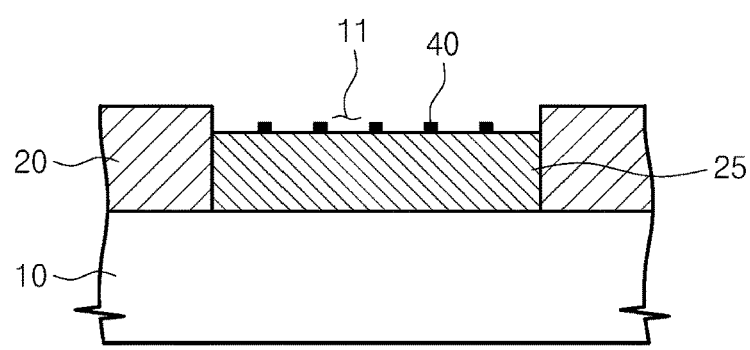
Figure 8:
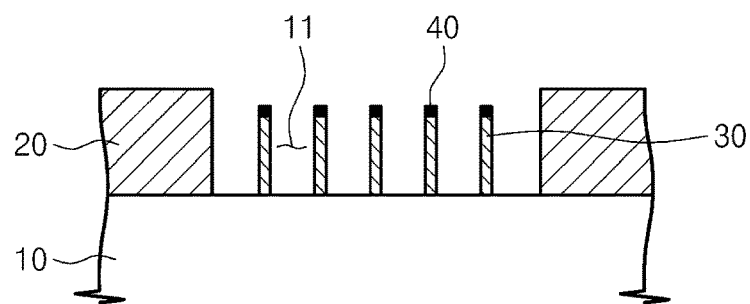
Figure 8:
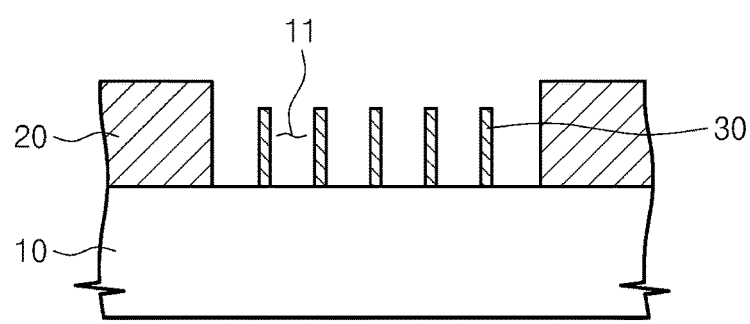

FIG. 7 is a flowchart illustrating a method for manufacturing a color filter, according to an embodiment of the inventive concept. FIG. 8 illustrates a procedure of forming a first structure of a color filter, according to an embodiment of the inventive concept. Hereinafter, a method for manufacturing a color filter according to an embodiment of the inventive concept will be described with reference to FIGS. 7 and 8.

First, the bank 20 is formed on the substrate 10 (S10). The bank 20 defines the pixel unit 11.

Before forming the bank 20 on the substrate 10, a process of modifying the surface of the substrate 10 to have an ink-philic property may be performed. The process of modifying the surface of the substrate 10 to have the ink-philic property is to expose the substrate 10 to plasma excited with process gas having the ink-philic property.

Thereafter, a process of laminating a second material layer, which includes a material having an ink-philic property, on the substrate 10, and modifying the surface of the laminated second material layer to have an ink-repellent property may be performed. The process of modifying the surface of the second material layer to have the ink-repellent property is to expose the substrate, on which the second material layer is laminated, to plasma excited with process gas having the ink-repellent property.

A second photoresist thin film pattern, which is not etched, is formed on a top surface, which is modified to have the ink-repellent property, of the second material layer, and the second material layer exposed between second photoresist thin film patterns is etched to form the bank 20.

A first material layer 25 including a material, which is etchable, is filled in the plurality of pixel units 11 partitioned into each other by the bank 20 formed on the substrate 10, thereby forming a film having a height lower than that of the bank 20. The process of filling the first material layer 25 may be performed through not only an ink-jet printing technique, but also a physical vapor deposition (PVD) or chemical vapor deposition (CVD) technique.

A first photoresist thin film pattern 40, which includes a material not etched, is formed on a top surface of the first material layer 25. Then, the first material layer 25 exposed between first photoresist thin film patterns 40 is etched to form the plurality of first structures 30 (S20). When the first photoresist thin film pattern 40 includes a transparent material, the first photoresist thin film pattern 40 may not be removed. When the first photoresist thin film pattern 40 includes an opaque material, an ashing process of removing the first photoresist thin film pattern 40 is performed.

The color filter is manufactured by dropping an ink droplet on the pixel unit 11 having the first structure 130 (S30).

Embodiments of the inventive concept may provide a color filter having higher quality and a method for manufacturing the color filter, in which a defect rate may be reduced.

Embodiments of the inventive concept may provide a color filter, capable of minimizing micro-spots, and a method for manufacturing the color filter.

The effects of the inventive concept are not limited to the abovementioned effects, and any other effects not mentioned herein will be clearly understood from the following description by those skilled in the art to which the inventive concept pertains.

Hereinabove, although the inventive concept has been described with reference to embodiments and the accompanying drawings, the inventive concept is not limited thereto, but may be variously modified and altered by those skilled in the art to which the inventive concept pertains without departing from the spirit and scope of the inventive concept claimed in the following claims. Therefore, the embodiments of the inventive concept are provided to explain the spirit and scope of the inventive concept, but not to limit them, so that the spirit and scope of the inventive concept is not limited by the embodiments. The scope of the inventive concept should be construed on the basis of the accompanying claims, and all the technical ideas within the scope equivalent to the claims should be included in the scope of the inventive concept.

What is claimed is:

1. A color filter comprising:
a substrate;
a bank formed on the substrate to partition a plurality of pixel units into each other;
a plurality of structures formed on a pixel unit of the plurality of pixel units, and having a width narrower than a width of the pixel unit, and a height lower than a height of the bank; and
an ink film filled in the pixel unit and having a height higher than the height of a structure of the structures,
wherein, between a pair of opposing walls of the bank, each of the structures longitudinally extends on a surface of the substrate in a same direction as a remaining of the structures,
wherein an other pair of opposing walls extends between the pair of opposing walls to confine the ink film within the bank,
wherein the pair of opposing walls and the other pair of opposing walls completely encircle the structures to prevent flow of the ink film out of the bank,
wherein said each of the structures longitudinally extends in a width direction of the bank,
wherein, in the bank, an entirety of the surface of the substrate is covered by the structures and the ink film,
wherein the structure has a wall structure,
wherein a surface of the plurality of structures has an ink-philic property,
wherein a surface, which makes contact with the ink film, of the bank has an ink-philic property,
wherein the plurality of structures includes a transparent material, and
wherein a top surface of the bank has an ink-repellent property.

2. The color filter of claim 1, wherein the plurality of structures protrudes upward from a surface, which constitutes the pixel unit, of the substrate.

3. The color filter of claim 1, wherein the plurality of structures includes a material that is etchable.

4. The color filter of claim 1, wherein the plurality of structures includes an insulating material.

5. The color filter of claim 1, wherein the plurality of structures are arranged at distances ranging from an order of tens of nm to an order of tens of μm.

6. A color filter comprising:
a substrate including a top surface having an ink-philic property;
a bank formed on the substrate to partition a plurality of pixel units into each other, and including a side surface having an ink-philic property and a top surface having an ink-repellent property;
a plurality of structures formed in the pixel unit, having a width narrower than a width of a pixel unit of the plurality of pixel units and a height lower than a height of the bank, including an insulating material that is transparent and etchable, and including a surface having the ink-philic property; and
an ink film having a height higher than a height of a structure of the structures and filled in the pixel unit,
wherein, between a pair of opposing walls of the bank, each of the structures longitudinally extends on a surface of the substrate in a same direction as a remaining of the structures,
wherein an other pair of opposing walls extends between the pair of opposing walls to confine the ink film within the bank,
wherein the pair of opposing walls and the other pair of opposing walls completely encircle the structures to prevent flow of the ink film out of the bank,
wherein said each of the structures longitudinally extends in a width direction of the bank,
wherein, in the bank, an entirety of the surface of the substrate is covered by the structures and the ink film, and
wherein the structure has a wall structure.

* * * * *